Aug. 9, 1938.     H. GEORGE ET AL     2,125,912
ELECTRICAL HEATING
Filed Dec. 27, 1932     2 Sheets-Sheet 1
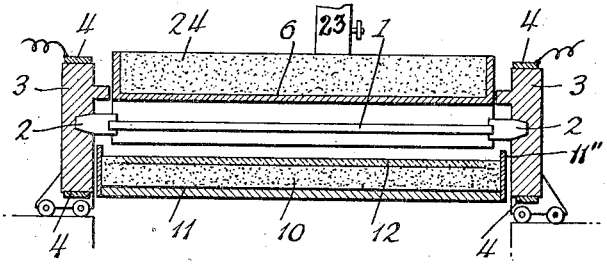
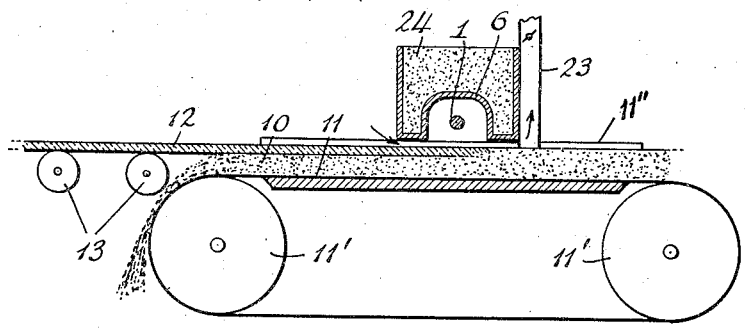
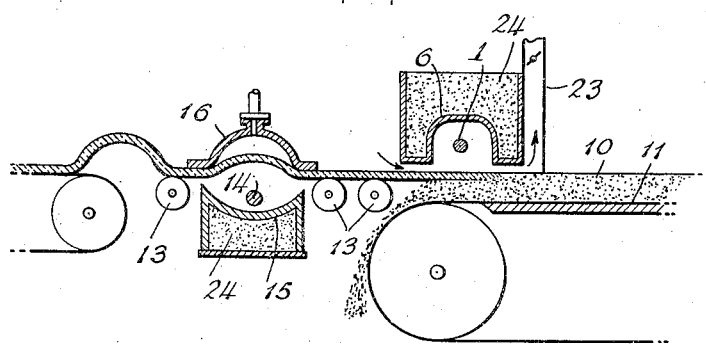
INVENTORS
HENRI GEORGE
GASTON DELPECH
BY
Oscar A. Geier
ATTORNEY Aug. 9, 1938.  H. GEORGE ET AL  2,125,912
ELECTRICAL HEATING
Filed Dec. 27, 1932  2 Sheets-Sheet 2
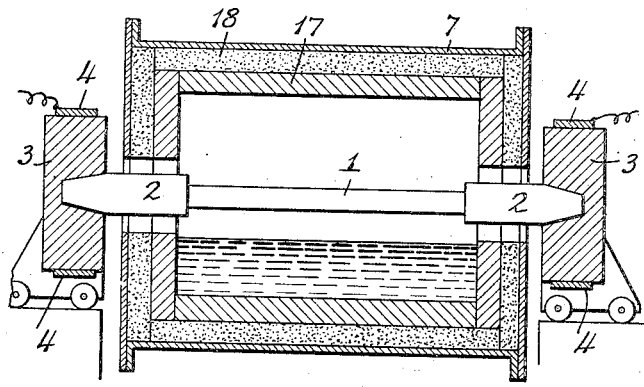
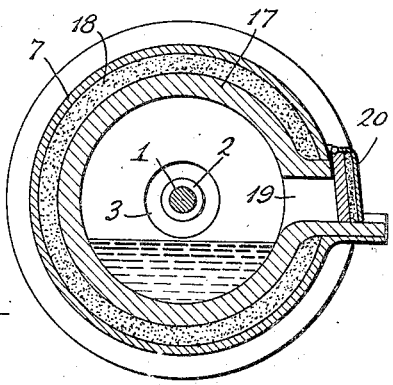
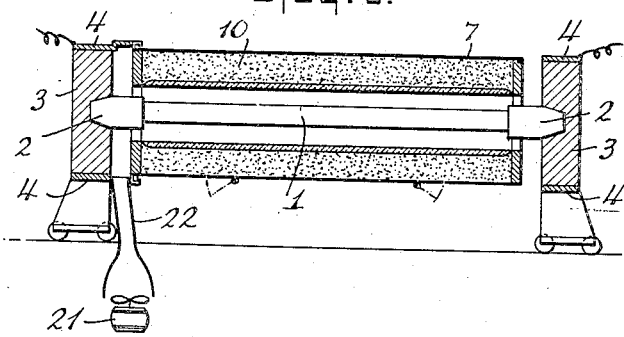
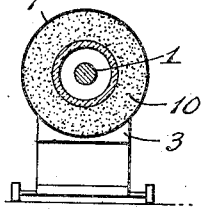
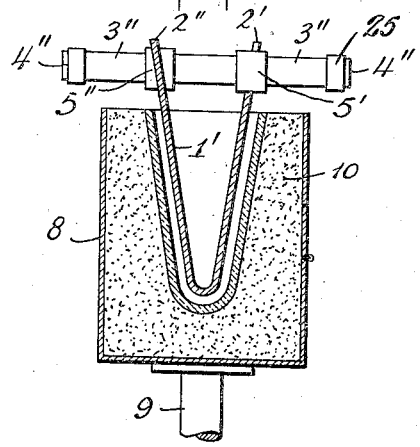
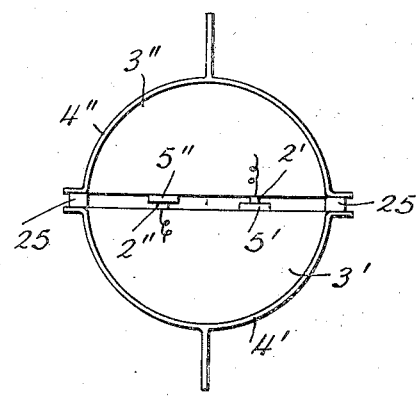
INVENTORS
HENRI GEORGE
GASTON DELPECH
BY
Oscar A. Geier
ATTORNEY Patented Aug. 9, 1938

2,125,912

UNITED STATES PATENT OFFICE 2,125,912

ELECTRICAL HEATING

Henri George, Paris, and Gaston Delpech, Clamart, France, assignors to Societe Anonyme des Manufactures des Glaces & Produits Chimiques de Saint-Gobain, Chauny & Cirey, Paris, France Application December 27, 1932, Serial No. 648,996
In France December 26, 1931

1 Claim. (Cl. 219—36)

(Granted under the provisions of sec. 14, act of March 2, 1927; 357 O. G. 5)

This invention refers to electrical heating and relates more particularly to a method and means for fusing articles made of substances having a high melting point.

Electric furnaces known in the art employ an arc or a heating element which remains in contact with either the treated substance or some heat radiating members during the entire treatment. These furnaces have a comparatively low efficiency, particularly when substances having a high melting point are under treatment, since a large percentage of heat is lost in the course of the process.

An object of this invention is to obviate this drawback by providing an electrical heating device in which the largest possible amount of heat produced is utilized for the required purpose.

Another object is to provide a method of heating substances in which the heat radiated by a heating element is equally and uniformly distributed over the entire surface of the treated substance.

The above and other objects of this invention may be realized by the provision of a heating element consisting of a carbon rod which, during the entire process of heating, does not come in contact with either the substance under treatment or with any heat-radiating surfaces which may transmit heat to said substance. The treated substance, furthermore, is moved about in relation to the carbon rod during the heating in a direction perpendicular to the direction of said rod, i. e., at right angles to the current flowing through the rod. The heating element is made preferably, of graphite since graphite is a substance which can resist high temperature and in which a high density of current can be maintained.

Reactions which occur when there is a contact between the heating element and the treated substance will not take place when the heating is carried out in a device constructed in accordance with this invention; heat losses are diminished since the heating element does not come into contact with heat radiating surfaces. This device is far more efficient than those known in the art, it assures a more even temperature and its action is more widely distributed.

Furthermore, in accordance with this invention a gaseous medium is caused to circulate between the heating element and the treated substance. The purpose of this gaseous medium is the prevention of either the reduction or the oxidation of the treated substance; and it also causes the removal from the furnace of any vapors which may have appeared during the heating process.

The invention will appear more clearly from the following detailed description when taken in connection with the accompanying drawings showing preferred embodiments of the inventive idea.

In the drawings:

Figure 1 shows in cross-section a device for manufacturing silica plates.

Figure 2 is a longitudinal section through the same device.

Figure 3 shows a similar device comprising an additional heater used for remolding silica plates.

Figure 4 is a vertical section through a rotatable furnace.

Figure 5 is a section along the line 5—5 of Figure 4.

Figure 6 is a vertical section through another furnace adapted to manufacture tubular articles.

Figure 7 is a section along the line 7—7 of Figure 6.

Figure 8 shows in section another modification of the inventive idea, and

Figure 9 is a top view of the device shown in Figure 8.

The device illustrated in Figures 1 and 2 is used for the production of plates made of molten silica and comprises a resistance or a heating element 1 consisting of a straight carbon or graphite rod. The heating element 1 is situated above the substance to be treated and is supported at its two ends by sleeves 2 carried by movable plates 3. The plates 3 as well as the sleeves 2 are preferably made of the same conducting material as the heater 1. The plates 3 carry metal coverings 4 which are firmly attached to said plates and connected with a source of electrical current, not shown in the drawings.

The heating surfaces used for transmitting heat to the treated substance form a part of a container 6, made preferably of graphite, and having an arch-shaped bottom which surrounds the heater 1, on three sides. The container 6 is filled with lampblack, soot or a similar substance 24 which is used for increasing the effect of the heat radiating surfaces. The side surfaces of the movable plates 3 are so shaped that they form a continuation of the container 6 and are also used for the radiation of heat.

The ground raw substance 10, for instance ground silica, is carried by an endless belt 11 passing over pulleys 11' and under the heater 1 and heat radiating surfaces of the members 6 and 3. The belt 11 is moved with a velocity depending on the thickness of the substance 10, said velocity being selected with the view to permitting the melting of a predetermined part of the substance 10. Side walls 11″ prevent the substance 10 from dropping over the edges of the belt 11 during the movement of the latter.

The upper layers of the ground substance 10 form a crust 12 in the course of the heating process. This crust 12 is finally separated from the ground substance by rotating rollers 13 or similar members and is passed over these rollers after the container 11 has moved beyond the heating means, the rollers 13 removing the crust for further treatment. The lower layers of the ground substance 10 which have not been smelted together by the heat drop off the endless belt 11 and are collected in a container, not shown in the drawings.

In some cases it is advisable to periodically reverse the direction of rotation of the pulleys 11′ after a part of the belt 11 has passed under the heater 1 and to place fresh layers of the substance 10 over the crust 12, one of the layers being added when the crust is situated on one side of the container 6, while the adjacent layer is added as soon as the crust is moved to the opposite side of the container 6. In this case the final crust is composed of a number of thin superimposed layers of the treated substance. Such crusts can be used in the manufacture of transparent quartz from ground rock crystal.

A gaseous medium used for the purpose of preventing the reduction, or oxidation of the treated substance passes between the heat radiating surfaces of the container 6 and the ground substance 10 or the crust 12 during the entire heating process. A chimney 23, shown in Figure 2, or any other suitable means, may be used for providing the circulation of the gas.

The heating device shown in Figures 1 and 2 may be used along with means for reheating the crust illustrated in Figure 3. These means comprise a heating element 14 situated below the crust 12 and surrounded on three sides by heat radiating surfaces 15 forming a container for lampblack or soot 24.

As shown in Figure 3, the crust 12 is taken up by a first group of rollers 13 after the removal of the superfluous ground substance 10 and is passed over the heating element 14. The crust 12 is reheated by this element which softens particles of the ground substance adhering to and carried by the lower surface of the crust. A mold 16 is used for shaping the crust or sheet 12 which is thus glazed on both sides by the heaters 1 and 14. The crust 12 is pressed into the mold 16 by suction or by any other suitable means. The mold 16 is moved manually or mechanically along with the crust 12 for a period of time sufficient for the completion of the molding process.

The round furnace shown in Figures 4 and 5 is used for the fusion of glass, metal and other substances which can be liquefied by heat; it comprises heating means similar to those illustrated in Figures 1 to 3 and consists of a heating rod 1, sleeves 2, plates 3 and metal coverings 4. The rod 1 passes through a cylinder 17 which is made of a refractory material. The substance or substances which are to be treated in the furnace are introduced into the cylinder 17 through an opening 19 which is also used for the removal of the treated material and which can be closed by a door 20.

Another cylinder 7 surrounds the cylinder 17. The space between the two cylinders is filled by a heat insulating substance 18 which prevents the escape of heat radiated by the heating element 1. The cylinders 7 and 17 and the insulation 18 form a single unit which can revolve around the heating element 1 during the heating process.

A cylindrical furnace of a somewhat different type, which is shown in Figures 6 and 7 of the drawings, is preferably used for the making of tubular articles. The heating means of this furnace are similar to those of the previously described modifications and comprise a heater 1, sleeves 2, plates 3 and metal coverings 4. A drum or cylinder 7 surrounds the heating element 1 and forms a container for the ground substance 10 which is placed in the cylinder before the insertion of the heater 1. The cylinder 7 is rotated during the heating process, the substance 10 being pressed against the walls of the cylinder by the centrifugal forces of rotation.

A gas which passes between the heating element and the heated substance during the heating process is introduced into the furnace by means of a ventilator 21 situated at the exterior end of a tube 22 and leading into the interior of the furnace.

A templet of any desired form, not shown in the drawings, may be used for molding the rotating substance 10 into any form similar to said board in cross-section. If the ground substance consists of silica the molten parts of the latter will retain their form on account of their great viscosity.

In some cases it is advisable to reduce gradually the velocity with which the cylinder 7 is rotated as soon as the treated substance begins to melt, especially if materials fusible in soft state are being treated.

This furnace may be used for the production of a number of short tubes of the same external diameter in one operation. Any desired number of annular graphite plates used for separating the raw substance may be employed for the production of these tubes, these plates being placed within the cylinder 7 at right angles to the heater and at certain predetermined distances from each other.

A piece of graphite may be inserted into the cylinder 7 parallel to the direction of the heater for the purpose of producing a tubular body having a longitudinal slit. The tubular body can be unrolled to form a plate after the completion of the heating process.

The part of the raw substance which is nearest to the walls of the cylinder 7 and which has not been smelted through the action of the heater 1 may be removed either totally or partially from the interior of the cylinder 7 at the end of the heating process and while the cylinder is being rotated. In that case the crust will adhere either to the unremoved ground particles or to the walls of the cylinder.

The heating element 1 shown in Figures 1 to 7 has the shape of a round rod. Rods of any other suitable shape as for example tubes or rods having a variable cross-section, may be used for the same purpose. In the case of larger furnaces it is advisable to use many parallel rods equal in number to the number of phases of a polyphase current and interconnected in star formation.

The device shown in Figures 8 and 9 is used for the making of hollow articles, such as crucibles or the like. The heating element used in this type of furnace has the shape of a bent rod 1′ having two ends 2' and 2" which are pressed towards each other by two semicircular carbon plates 3' and 3". The end 2' of the heater 1' is directly in contact with the plate 3" and is separated from the plate 3' by an insulation piece 5'; the end 2" is directly in contact with the plate 3' and is separated from the plate 3" by an insulation 5". Metal coverings 4' and 4" are used for holding together the two plates 3' and 3", said coverings being separated from each other by insulating pieces 25.

The plates 3' and 3" are used as a cover for the furnaces and radiate heat during the treatment. A container 8 which is rotatably mounted on a shaft 9 serves as a receptacle for the ground substance 10. When the container 8 is rotated the particles of the substance 10 move towards its walls through the action of the centrifugal forces. A templet of any desired form, not shown in the drawings, may be used for shaping the substance 10 into a desired form. Then the templet is removed and the element 1' is heated by means of an electrical current. The molten portion of the substance maintains its shape due to the action of the centrifugal forces. Articles made of silica or similar substances and having shapes quite different from those of the usual paraboloid may be produced by means of this process.

What is claimed is:

In combination, a hollow cylindrical container having a horizontal central axis, an elongated electric resistance within said container, means connected with said resistance for supplying an electric current thereto, said container being adapted to be filled with a comminuted fusible substance and having openings formed on the circumference thereof for the removal of superfluous amounts of said substance, and means connected with said container for rapidly rotating the same while an electric current is passed through said resistance, whereby the substance within said container is maintained at a predetermined radial distance from said resistance while it is being fused by the heat generated by said resistance.

HENRI GEORGE.
GASTON DELPECH.